US012811174B2

(12) United States Patent
Xie et al.

(10) Patent No.: US 12,811,174 B2
(45) Date of Patent: Nov. 24, 2026

(54) POLE PIECE FORMING APPARATUS

(71) Applicant: CONTEMPORARY AMPEREX TECHNOLOGY (HONG KONG) LIMITED, Hong Kong (CN)

(72) Inventors: Bin Xie, Ningde (CN); Shitong Chen, Ningde (CN); Yi Lu, Ningde (CN); Yuanyuan Shen, Ningde (CN); Keqiang Li, Ningde (CN); Fenggang Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 601 days.

(21) Appl. No.: 18/239,127

(22) Filed: Aug. 29, 2023

(65) Prior Publication Data

US 2023/0411670 A1 Dec. 21, 2023

Related U.S. Application Data

(63) Continuation of application No. PCT/CN2022/121227, filed on Sep. 26, 2022.

(30) Foreign Application Priority Data

Nov. 29, 2021 (CN) ......................... 202111450643.2

(51) Int. Cl.
*H01M 10/04* (2006.01)

(52) U.S. Cl.
CPC ............................... *H01M 10/0409* (2013.01)

(58) Field of Classification Search
CPC ................................................ H01M 10/0409
See application file for complete search history.

(56) References Cited

FOREIGN PATENT DOCUMENTS

| | | | |
|---|---|---|---|
| CN | 202114192 | U | 1/2012 |
| CN | 203410045 | U | 1/2014 |
| CN | 204809311 | U | 11/2015 |
| CN | 106505180 | A | 3/2017 |
| CN | 208373870 | U | 1/2019 |
| CN | 209614595 | U | 11/2019 |

(Continued)

OTHER PUBLICATIONS

CN110676426 translation (Year: 2020).*

(Continued)

*Primary Examiner* — Jane J Rhee
(74) *Attorney, Agent, or Firm* — XSENSUS LLP

(57) ABSTRACT

The present application provides a pole piece forming apparatus, which may include an incoming structure, a slitter, a plurality of winders and a wrinkle remover. The incoming structure may provide a master pole piece. The slitter may slit the master pole piece into a plurality of pole pieces. The winders may pull the transport of the pole pieces, respective winding devices may wind one corresponding pole piece, and the slitter may be disposed between the incoming structure and the winders. The wrinkle remover may be arranged between the slitter and the winders. The wrinkle remover may include a first roller and a second roller that may be provided opposite to each other, the first roller may include a first rolling part, and the first rolling part and the second roller may be used for rolling an edge of a slitting edge of the pole piece.

12 Claims, 4 Drawing Sheets

(56) References Cited

FOREIGN PATENT DOCUMENTS

| | | | |
|---|---|---|---|
| CN | 110676426 | A | 1/2020 |
| CN | 110899336 | A | 3/2020 |
| CN | 210418532 | U | 4/2020 |
| CN | 111293277 | A | 6/2020 |
| CN | 212434665 | U | 1/2021 |
| CN | 214872873 | U | 11/2021 |
| CN | 112563444 | B | 8/2022 |
| JP | 2016-018647 | A | 2/2016 |
| WO | 2021/098539 | A1 | 5/2021 |

OTHER PUBLICATIONS

CN110899336 translation (Year: 2020).*
CN210418532 translation (Year: 2020).*
CN207558931 translation (Year: 2018).*
CN209614595 translation (Year: 2019).*
CN111293277 translation (Year: 2020).*
International Search Report and Written Opinion mailed on Nov. 1, 2022, received for PCT Application PCT/CN2022/121227, filed on Sep. 26, 2022, 10 pages including English Translation.
Notice of the Granting of a Patent Right for an Invention issued Nov. 6, 2025 in Chinese Patent Application No. 202111450643.2 with English translation thereof.
European Search Report issued Aug. 20, 2024 in European Patent Application No. 22897353.3.

* cited by examiner

POLE PIECE FORMING APPARATUS

CROSS-REFERENCE TO RELATED APPLICATIONS

The present application is a continuation of International Patent Application No. PCT/CN2022/121227, filed on Sep. 26, 2022, which claims priority of a Chinese Patent Application 202111450643.2 entitled "POLE PIECE FORMING APPARATUS" filed on Nov. 29, 2021, the entire contents of each of which are incorporated herein by reference.

TECHNICAL FIELD

The present application relates to the technical field of pole piece processing, in particular to a pole piece forming apparatus.

BACKGROUND

Batteries are widely used in electrical devices, such as mobile phones, notebook computers, battery cars, electric cars, electric planes, electric ships, electric toy cars, electric toy ships, electric toy planes and electric tools. Batteries can include nickel-cadmium batteries, nickel-hydrogen batteries, lithium-ion batteries and secondary alkaline zinc-manganese batteries.

In the development of battery technology, pole piece is an important part of battery. It is a matter of continuous improvement in battery technology to ensure the smooth progress of various processes in the production process of pole piece, reduce the rejection rate in the production process of pole piece and improve the product quality of pole piece.

SUMMARY

The present application provides a pole piece forming apparatus, which can improve the product quality of the pole piece and reduce the rejection rate in the production process of the pole piece.

The present application provides a pole piece forming apparatus, which includes: an incoming device or structure for providing a master pole piece; a slitting device or slitter for slitting the master pole piece into a plurality of pole pieces; a plurality of winding devices or winders for transport pulling of the pole pieces, respective winding devices winding one corresponding pole piece, and the slitting device being disposed between the incoming device and the winding devices; and a wrinkle removing device or remover arranged between the slitting device and the winding devices, wherein the wrinkle removing device includes a first roller and a second roller that are provided opposite to each other, the first roller includes a first rolling part, and the first rolling part and the second roller are used for rolling an edge of a slitting edge of the pole piece.

In the pole piece forming apparatus provided by the present application, the wrinkle removing device is arranged between the slitting device and the winding devices, and the wrinkle removing device is arranged including the first roller and the second roller that are provided opposite to each other, and the slitting edges of the pole pieces are rolled by the first rolling part of the first roller and the second roller, so that the risk of wrinkling of the pole pieces formed after slitting the master pole piece is effectively reduced, the yield of the pole piece is improved, and the safety of the battery produced from the pole pieces in the working process is improved.

In some embodiments, a diameter of the first rolling part is changed from small to large in an axial direction of the first roller, and a portion with a largest diameter of the first rolling part is used for rolling the edge of the slitting edge; a portion with a smaller diameter of the first roller is closer to a middle position of the pole piece. With this arrangement, the edge of the slitting edge prone to wrinkles can be rolled by the portion with the largest diameter of the first rolling part. The stress distribution at the slitting edge of the pole piece is more uniform after being rolled by the wrinkle removing device, which is beneficial to improve the wrinkle removing effect of the pole piece.

In some embodiments, the diameter of the first rolling part is changed from small to large by an arc transition structure or a step transition structure. Both the arc-shaped transition structure and the step transition structure can achieve the purpose of increasing the diameter of the first rolling part from small to large.

In some embodiments, in the axial direction of the first roller, the diameter of the first rolling part first is changed from small to large and then is changed from large to small. With this arrangement, it is possible to make one rolling part correspond to the edges of the slitting edges of two pole pieces, thereby simplifying the structure of the wrinkle removing device. At the same time, the rolling force of the wrinkle removing device on the pole piece gradually decreases from the edge of the slitting edge to the middle of the pole piece, so that the stress distribution of the slitting edge of the pole piece after passing through the wrinkle removing device is more uniform, and the risk of wrinkling of the pole piece is further reduced.

In some embodiments, the second roller includes a second rolling part opposite the first rolling part, and a diameter of the second rolling part is changed from small to large in an axial direction of the second roller; and a portion with a largest diameter of the second roller is opposite to the portion with the largest diameter of the first roller. The first rolling part and the second rolling part can be provided with the same shape, and both are arranged opposite to each other. With this arrangement, when the wrinkle removing device rolls the slitting edge of the pole piece, the force on the two side surfaces of the pole piece is more balanced, and the space for stress release along the two sides of the pole piece in the wrinkle removing process is consistent, which is beneficial to the smooth progress of the wrinkle removing work of the pole piece and reduces the possibility of wrinkling again of the pole piece in the rolling process.

In some embodiments, the first roller is internally provided with a flow path for circulating a heat conductive medium, the heat conductive medium being used for heat exchange with the first roller. Therefore, it is convenient to better remove the winkles of the slitting edges of the pole pieces. In addition, for the pole pieces after lithium replenishment, the active substances can be accelerated to embed into the pole pieces by heating the pole pieces by the first roller.

In some embodiments, the heat conductive medium exchanges heat with the first roller to maintain a surface temperature of the first roller adjacent to the pole piece between 35° C. and 40° C. With this arrangement, the possibility that the structure of the pole pieces is damaged due to excessive temperature of the pole pieces can be reduced while the stress reloading process of the pole pieces can be ensured, and the embedding of active materials into the pole piece can be accelerated.

In some embodiments, the flow path is helically arranged about a centerline of the first roller. The helically arranged flow path has a larger area corresponding to an outer surface of the first roller, which is beneficial to improve the heat exchange rate between the heat conductive medium and the first roller.

In some embodiments, a distance between the flow path and an outer surface of the first roller is d, where $0<d\leq 2$ mm. Thus, the heat exchange rate between the heat conductive medium and the outer surface of the first roller can be increased, and thus the heat exchange rate between the first roller and the pole piece can be increased.

In some embodiments, the pole piece forming apparatus further includes: a lithium replenishment device or replenisher arranged between the incoming device and the slitting device, the lithium replenishment device being used for cladding a lithium strip to a surface of the master pole piece. Integrating the lithium replenishment and slitting process of pole pieces into the pole piece forming apparatus can improve the structural integration of the pole piece forming apparatus and simplify the operation procedures in the pole piece forming process.

In some embodiments, the pole piece forming apparatus further includes a deflection correcting device or corrector for guiding a transport direction of the pole pieces; the deflection correcting device is arranged between the slitting device and the wrinkle removing device; and/or, the deflection correcting device is arranged between the wrinkle removing device and the winding devices. This arrangement has better wrinkle removing effect and reduces the possibility of secondary wrinkles after the pole piece wrinkle removing process is completed.

In some embodiments, the pole piece forming apparatus further includes a burr treatment device or structure disposed between the slitting device and the winding devices, the burr treatment device including: a brush mechanism or brush for removing burrs of the slitting edges; and a dust collecting mechanism or collector for collecting burrs removed by the brush mechanism. It reduces the risk that burrs flow arbitrarily and affect the cleanliness of the pole piece production environment, and at the same time, it can reduce the risk that burrs fall on the surface of the pole piece and puncture the pole piece during the subsequent processing of the pole piece.

In some embodiments, the pole piece forming apparatus further includes: a glue application mechanism or applicator disposed between the burr treatment device and the winding devices, for applying glue to the slitting edges; and a drying device or dryer arranged between the glue application mechanism and the winding devices, for drying the pole piece after glue application. Therefore, the slitting edges of the pole pieces can be avoided from being exposed, and the risk of short circuit of subsequent pole pieces in use can be reduced.

BRIEF DESCRIPTION OF DRAWINGS

In order to more clearly illustrate the technical solutions in embodiments of the present application, the following will briefly introduce the drawings that are desired to be used in the description of the embodiments. Obviously, the drawings in the following description are merely some embodiments of the present application, from which other drawings may be obtained without exerting inventive effort by those ordinarily skilled in the art.

Figure 1:
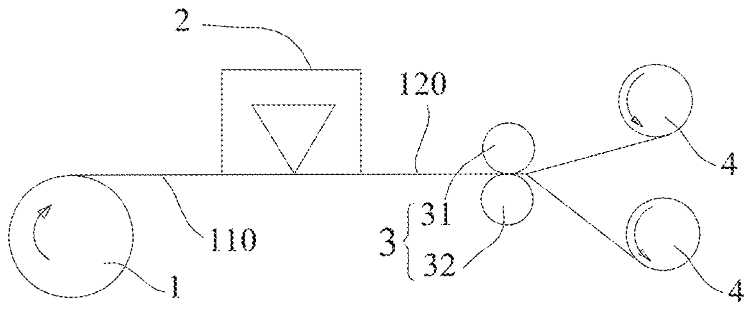
FIG. 1 is a schematic structure diagram of a pole piece forming apparatus provided by the present embodiments.

In the drawings, the drawings are not necessarily drawn to actual scale.

ILLUSTRATION OF REFERENCE SIGNS

1. incoming device; 2. slitting device; 3. wrinkle removing device; 31. first roller; 31*a*. first rolling part; 31*b*. flow path; 32. second roller; 32*a*. second rolling part; 4. winding devices; 5. lithium replenishment device; 51. lithium strip unwinding mechanism; 52. release agent coating mechanism; 53. press roller mechanism; 54. traction film winding mechanism; 6. deflection correcting device; 7. burr treatment device; 71. brush mechanism; 72. dust collecting mechanism; 8. glue application mechanism; 9. drying device;

110. master pole piece; 120. pole piece; 120*a*. slitting edge.

DETAILED DESCRIPTION OF EMBODIMENTS

Embodiments of the present application are described in further detail below with reference to the accompanying drawings and embodiments. The following detailed description of the embodiments and the accompanying drawings are used for exemplary illustration of the principles of the present application, but are not intended to limit the scope of the present application, i.e., the present application is not limited to the described embodiments.

In the description of the present application, it should be noted that, unless otherwise stated, "multiple" means more than two. The terms "up," "down," "left," "right," "inside," "outside" and the like indicate orientations or positional relationships for ease of description of the present application and simplification of the description only and are not intended to indicate or imply that the device or element in question is required to have a particular orientation, be constructed and operate in a particular orientation and therefore cannot be construed as limiting to the present application. In addition, the terms of "first," "second," "third," or the like are for descriptive purposes only and cannot be construed as indicating or implying relative importance. “Perpendicular” is not vertical in the strict sense, but within the allowable range of errors. “Parallelism” is not parallel in the strict sense, but within the allowable range of errors.

The locative words appearing in the following description are all directions shown in the figure and are not intended to limit the specific structure of the present application. In the description of the present application, it should be noted that the terms “install”, “connect”, “couple” and the like are to be understood in a broad sense, unless otherwise expressly specified and limited, for example, it may refer to a fixed connection, may also refer to a detachable connection, or may refer to an integral connection; it may refer to a direct connection or an indirect connection via an intermediate medium. For those ordinarily skilled in the art, the specific meanings of the above terms in the present application will be understood according to the specific circumstances.

Batteries, such as lithium-ion secondary batteries, lithium-ion primary batteries, lithium sulfur batteries, sodium lithium-ion batteries, sodium ion batteries or magnesium ion batteries, etc., have the advantages of high energy density, high power density, multiple recycling times, long storage time, etc., and have been widely used in electrical devices suitable for batteries. For example, the electrical device may be a vehicle, a mobile phone, a portable device, a notebook computer, a ship, a spacecraft, an electric toy, an electric tool, and the like. Vehicles can be fuel vehicles, gas vehicles or new energy vehicles, and new energy vehicles can be pure electric vehicles, hybrid vehicles or extended-range vehicles; spacecrafts include airplanes, rockets, space shuttles and spaceships, etc.; electric toys include fixed or mobile electric toys, such as game machines, electric car toys, electric ship toys, electric plane toys and so on; electric tools include metal slitting electric tools, grinding electric tools, assembly electric tools and railway electric tools, such as electric drills, electric grinders, electric wrenches, electric screwdrivers, electric hammers, impact electric drills, concrete vibrators and electric planers, etc.

In the production process of battery, the pole pieces of battery need to go through coating, rolling, drying, slitting and other processes, and some pole pieces need to be supplemented with lithium.

After the inventor discovered that the edge of the pole piece formed in the production process of the pole piece was wrinkled, the inventor systematically analyzed and studied the forming process and forming apparatus of the pole piece, and found that there was a certain stress in the master pole piece after lithium replenishment, coating or rolling. In the process of slitting the master pole piece to form the pole piece, the stress of the master pole piece at the slitting place will be released instantly, the slitting edge of the pole piece thus formed has no tension, but the stress on the side without passing through the slitting knife is not released. The stress release on both sides of the pole piece thus formed is inconsistent, and the stress distribution on both sides is different, which is easy to cause wrinkling problems such as wave edge, collapse edge or serious sinking of the slitting edge of the pole piece, especially for the pole piece after lithium replenishment process. The master pole piece after lithium replenishment becomes brittle and hard, and the stress difference on both sides of the pole piece formed after slitting is greater, so that the risk of wrinkling of the pole piece is higher.

Based on the above problems discovered by the inventor, the inventor improves the structure of the pole piece forming apparatus, and the technical solution described in the embodiments of the present application is applicable to the pole piece forming apparatus.

Figure 2:
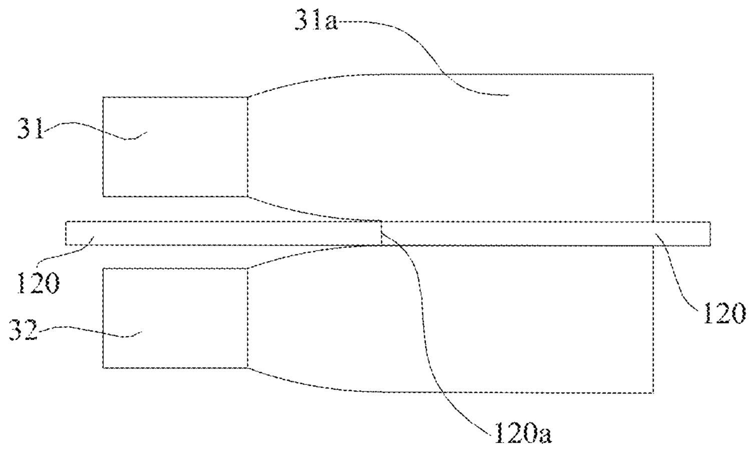
FIG. 2 is a schematic structure diagram of rolling a pole piece by a first roller and a second roller in the pole piece forming apparatus provided by embodiments of the present application.

FIG. 1 is a schematic structure diagram of a pole piece forming apparatus provided by embodiments of the present application, and FIG. 2 shows a schematic structure diagram of a first roller 31 and a second roller 32 with the rolled pole piece 120.

According to the embodiment of the present application, as shown in FIGS. 1 and 2, the pole piece forming apparatus includes an incoming device 1, a slitting device 2, a plurality of winding devices 4 and a wrinkle removing device 3. The incoming device 1 is used to provide a master pole piece 110. The slitting device 2 is used for slitting the master pole piece 110 into a plurality of pole pieces 120. The winding devices 4 are used for transport pulling of the pole pieces 120, respective winding devices 4 wind one corresponding pole piece 120, and the slitting device 2 is arranged between the incoming device 1 and the winding devices 4. The wrinkle removing device 3 is arranged between the slitting device 2 and the winding devices 4. The wrinkle removing device 3 includes a first roller 31 and a second roller 32 that are provided opposite to each other. The first roller 31 includes a first rolling part 31*a*, and the first rolling part 31*a* and the second roller 32 are used for rolling the edges of the slitting edges 120*a* of the pole pieces 120.

Specifically, the slitting device 2 slits the master pole piece 110 into a plurality of pole pieces 120 along the slitting edge 120*a* of the pole piece 120. After the slitting is completed, the edge of the slitting edge 120*a* of the pole piece 120 is prone to wrinkles. The first pressing part 31*a* of the first roller 31 clamps and rolls the edge of the slitting edge 120*a* of the pole piece 120 together with the second roller 32. During the rolling process, the stress at the edge of the slitting edge 120*a* of the pole piece 120 is redistributed, and the wrinkles of the slitting edge 120*a* are flattened.

It will be understood that the configuration and shape of the first roller 31 and the second roller 32 are not limited, and the shapes of the first and second rollers may be the same or different so long as the edge of the slitting edge 120*a* of the pole piece 120 can be clamped and rolled. Exemplarily, the first roller 31 and the second roller 32 may be cylindrical, frustum-shaped or other irregular shapes, respectively. The first roller 31 and the second roller 32 may roll only the edge of the slitting edge 120*a* of the pole piece 120, or the entire pole piece 120 may be rolled. Different rolling forms correspond to different configurations of the first roller 31 and the second roller 32.

It should be noted that two or more pole pieces 120 may be formed after the master pole piece 110 is slitted, and one first rolling part 31*a* correspondingly rolls the edges of two slitting edges 120*a* of two adjacent pole pieces 120. When the number of pole pieces 120 formed after slitting is more than three, the first roller 31 may be provided with a plurality of first rolling parts 31*a* so that the edge of each slitting edge 120*a* has a corresponding first rolling part 31*a* for rolling. Of course, one first roller 31 may be provided with one first rolling part 31*a*, and a plurality of first rollers 31 may be provided, each first roller 31 corresponding to the edges of the slitting edges 120*a* of the two adjacent pole pieces 120.

In the pole piece forming apparatus provided by the embodiment of the present application, the wrinkle removing device 3 is arranged between the slitting device 2 and the winding devices 4, and the wrinkle removing device 3 includes the first roller 31 and the second roller 32 that are provided opposite to each other. The slitting edges 120*a* of the pole pieces 120 are rolled by the first rolling part 31*a* of the first roller 31 and the second roller 32, so that the risk of wrinkling of the pole pieces 120 formed after slitting the master pole piece 110 is effectively reduced, the yield of the pole piece 120 is improved, and the safety of the battery produced from the pole piece 120 in the working process is improved.

In some embodiments, a diameter of the first rolling part 31*a* is changed from small to large in an axial direction of the first roller 31, and a portion with a largest diameter of the first rolling part 31*a* is used for rolling the edge of the slitting edge 120*a*. A portion with a smaller diameter of the first roller 31 is closer to a middle position of the pole piece 120.

It can be understood that the stress release at the edge of the slitting edge 120*a* of the pole piece 120 is the most complete, and therefore the amplitude of wrinkling is also the most obvious, and the closer to the edge position of the pole piece 120 is, the more serious the wrinkling of the pole piece 120 is. Therefore, the diameter of the first rolling part 31*a* is arranged from small to large, and the portion with the largest diameter of the first rolling part 31*a* is provided for rolling the edge of the slitting edge 120*a*, so that the roll pressure at the edge of the slitting edge 120*a* of the pole piece 120 is maximum, and the roll pressure of the first rolling part 31*a* of the first roller 31 and the second roller 32 on the pole piece 120 gradually decreases from the edge of the slitting edge 120*a* of the pole piece 120 to the middle area of the pole piece 120. With this arrangement, the edge of the slitting edge 120*a* prone to wrinkles can be rolled by the portion with the largest diameter of the first rolling part 31*a*. The stress distribution at the slitting edge 120*a* of the pole piece 120 is more uniform after being rolled by the wrinkle removing device 3, which is beneficial to improve the wrinkle removing effect of the pole piece 120.

The first rolling part 31*a* may vary from small to large in a step transition form, a smooth transition form, a plane transition form or the like, without limitation.

In some embodiments, the diameter of the first rolling part 31*a* is changed from small to large by an arc-shaped transition structure or a step structure.

The diameter of the first rolling part 31*a* is changed from small to large by an arc-shaped transition structure, which may be a conical surface, an outward convex arc-shaped surface, or certainly a concave arc-shaped surface, without limitation here. By providing the arc-shaped transition structure, the diameter of the first rolling part 31*a* can be changed more smoothly, and the rolling force transition of the first rolling part 31*a* and the second roller 32 on the pole piece 120 can be smoother, which is beneficial to improving the wrinkle removing effect of the wrinkle removing device 3 on the pole piece 120.

In step transition of the first rolling part 31*a*, a plurality of step surfaces may be provided between the two ends of the first rolling part 31*a*, and the step height of the step surfaces may be set small enough to avoid damage to the pole piece 120 by the edges of the step surfaces. With this arrangement, the wrinkle removing effect of the wrinkle removing device 3 on the slitting edge 120*a* of the pole piece 120 can still be achieved.

It can be understood that one first rolling part 31*a* may correspond to one slitting edge 120*a* of one pole piece 120 or to two adjacent slitting edges 120*a* of two adjacent pole pieces 120.

Figure 3:
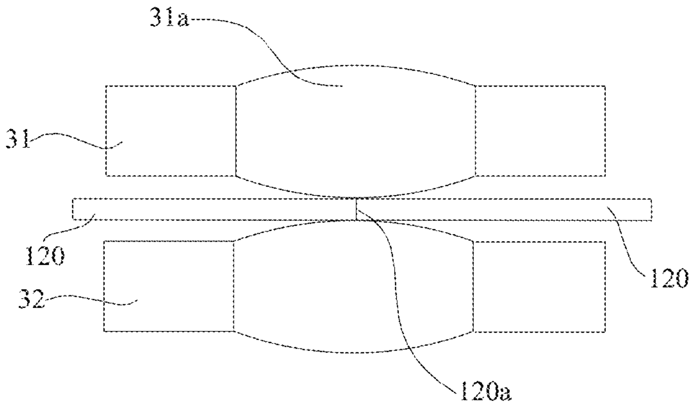
FIG. 3 is a schematic structure diagram of rolling a pole piece by the first roller and the second roller in another pole piece forming apparatus provided by embodiments of the present application.

In other embodiments, as shown in FIG. 3, in the axial direction of the first roller 31, the diameter of the first rolling part 31*a* is changed from small to large and then is changed from large to small.

It can be understood that the position with the largest diameter of the first rolling part 31*a* may corresponds to the edges of the slitting edges 120*a* of the two adjacent pole pieces 120. When the diameter of the first rolling part 31*a* corresponding to the pole pieces 120 gradually decreases from the edges of the slitting edges 120*a* of the pole pieces 120 to the middle direction of the pole pieces 120 on both sides, the rolling force of the wrinkle removing device 3 on the pole pieces 120 gradually decreases from the edges of the slitting edges 120*a* to both sides. With this arrangement, it is possible to make one rolling part correspond to the edges of the slitting edges 120*a* of two pole pieces 120, thereby simplifying the structure of the wrinkle removing device 3. At the same time, the rolling force of the wrinkle removing device 3 on the pole piece 120 gradually decreases from the edge of the slitting edge 120*a* to the middle of the pole piece 120, so that the stress distribution of the slitting edge 120*a* of the pole piece 120 after passing through the wrinkle removing device 3 is more uniform, and the risk of wrinkling of the pole piece 120 is further reduced.

Figure 4:
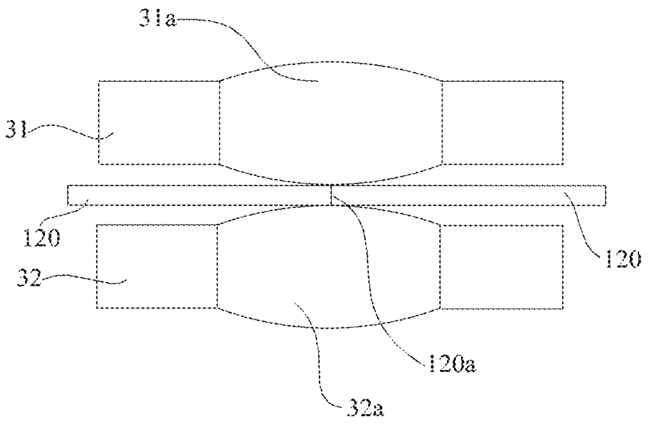
FIG. 4 is a schematic structure diagram of rolling a pole piece by the first roller and the second roller in yet another pole piece forming apparatus provided by embodiments of the present application.

In some embodiments, as shown in FIG. 4, the second roller 32 includes a second rolling part 32*a* opposite to the first rolling part 31*a*, and the diameter of the second rolling part 32*a* is changed from small to large in the axial direction of the second roller 32. A portion with a largest diameter of the second roller 32 is opposite to the portion with the largest diameter of the first roller 31.

It can be understood that the first rolling part 31*a* of the first roller 31 may be cylindrical, frustum-shaped or other irregular shapes.

Alternatively, the first rolling part 31*a* may have the same shape as the second rolling part 32*a*, and both are arranged opposite to each other. With this arrangement, when the wrinkle removing device 3 rolls the slitting edge 120*a* of the pole piece 120, the force on the two side surfaces of the pole piece 120 is more balanced, and the space for stress release along the two sides of the pole piece 120 in the wrinkle removing process is consistent, which is beneficial to the smooth progress of the wrinkle removing work of the pole piece 120 and reduces the possibility of wrinkling again of the pole piece 120 in the rolling process.

The first roller 31 and the second roller 32 may roll the slitting edge 120*a* of the pole piece 120 at room temperature, or may be heated or cooled as required, and there is no limitation here.

Figure 5:
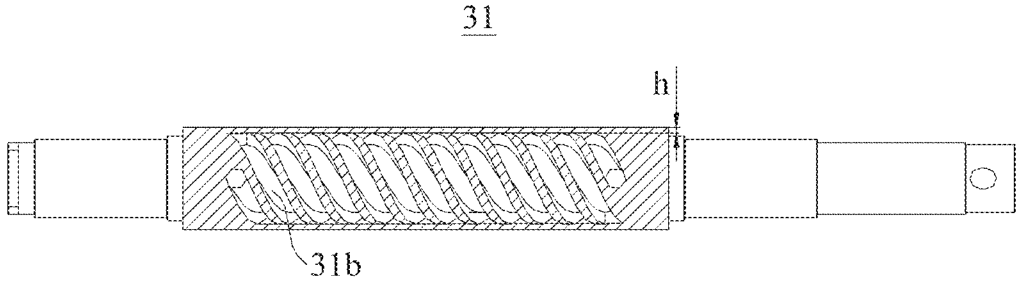
FIG. 5 is a schematic sectional view of the first roller in the pole piece forming apparatus provided by embodiments of the present application.

In some alternative embodiments, as shown in FIG. 5, the first roller 31 is internally provided with a flow path 31*b*. The flow path 31*b* is used for circulating a heat conductive medium for heat exchange with the first roller 31.

Specifically, the first roller 31 may be heated or cooled by the heat conductive medium in the flow path 31*b*. As an example, the heat conductive medium in the flow path 31*b* is used to heat the first roller 31, which heats the pole piece 120 in the process of rolling the pole piece 120, so that the stress reloading process of the slitting edge 120*a* of the pole piece 120 can be accelerated, and the wrinkles of the pole piece 120 can be better removed. In addition, for the pole pieces 120 after lithium replenishment, the active substances can be accelerated to embed into the pole pieces 120 by heating the pole pieces 120 by the first roller 31.

The heat conductive medium exchanges heat with the first roller 31 to maintain the first roller 31 in a preset temperature range, thereby maintaining the temperature of the pole piece 120 in the wrinkle removing process in the preset range, which can be set according to the specific requirements of the pole piece 120 in the wrinkle removing process.

In some alternative embodiments, the heat conductive medium exchanges heat with the first roller 31 to maintain a surface temperature of the first roller 31 adjacent to the pole piece 120 between 35° C. and 40° C. Specifically, the surface temperature can be 35° C., 38° C., 39° C., or 40° C., etc. With this arrangement, the possibility that the structure of the pole pieces 120 is damaged due to excessive temperature of the pole pieces 120 can be reduced while the stress reloading process of the pole pieces 120 can be ensured, and the embedding of active materials into the pole piece 120 can be accelerated.

The distribution pattern of the flow paths 31*b* in the first roller 31 is not limited, which may be labyrinth type, hollow cylinder type or other irregular patterns, without limitation here.

In some alternative embodiments, the flow path 31*b* is helically arranged about a centerline of the first roller 31.

It can be understood that with the flow path 31*b* helically arranged about the centerline of the first roller 31, under the condition that the occupied volume of the flow passage 31*b* is the same, the helically arranged flow path 31*b* has a larger area corresponding to an outer surface of the first roller 31, which is beneficial to improve the heat exchange rate between the heat conductive medium and the first roller 31.

It can be understood that the smaller the distance between the flow path 31*b* and the outer surface of the first roller 31, the faster the heat exchange rate between the heat conductive medium in the flow path 31*b* and the outer surface of the first roller 31. In some alternative embodiments, the distance between the flow path 31*b* and the outer surface of the first roller 31 is d, where $0<d\leq 2$ mm. Specifically, d may be 0.5 mm, 1 mm, 1.5 mm or 2 mm or the like. By setting the distance between the flow path 31*b* and the outer surface of the first roller 31 to satisfy the above-mentioned relationship, the heat exchange rate between the heat conductive medium and the outer surface of the first roller 31 can be increased, and thus the heat exchange rate between the first roller 31 and the pole piece 120 can be increased.

It should be noted that, in some alternative embodiments, the flow path may be provided inside the second roller 32, and the flow path may be provided spirally about the centerline of the second roller 32, which has the same technical effect as the flow path 31*b* provided inside the first roller 31, and will not be described here.

Figure 6:
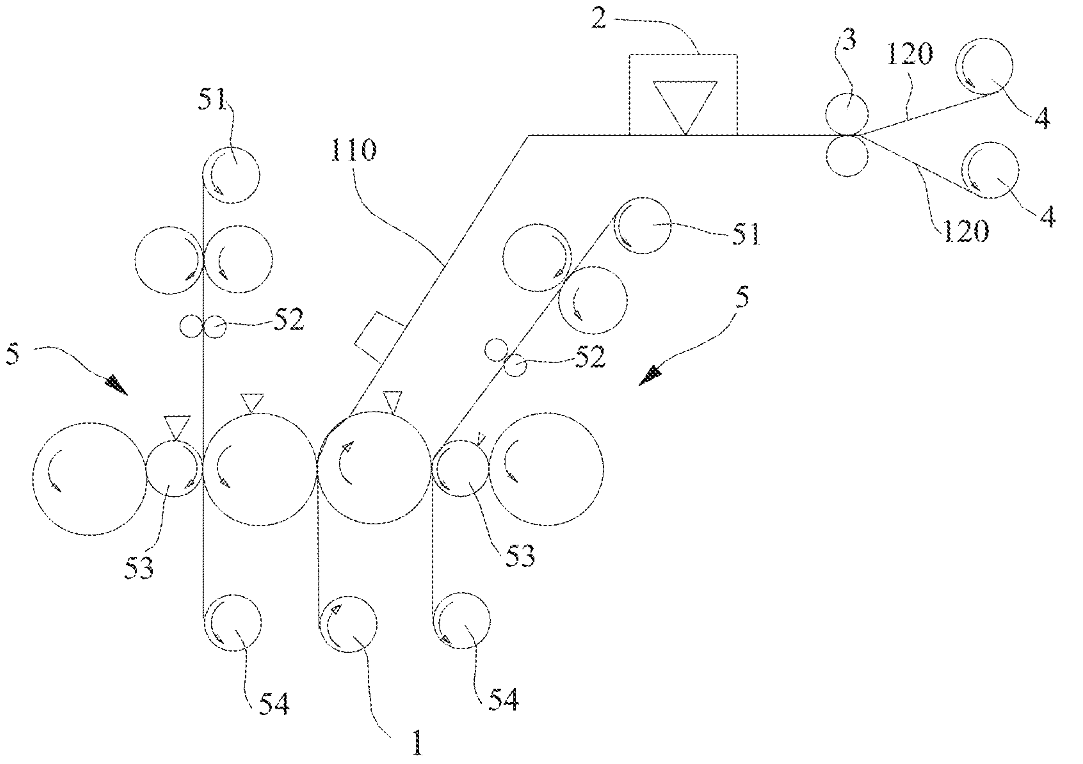
FIG. 6 is a structural schematic diagram of another pole piece forming apparatus provided by embodiments of the present application.

In some embodiments, as shown in FIG. 6, the pole piece forming apparatus further includes a lithium replenishment device 5. The lithium replenishment device 5 is disposed between the incoming device 1 and the slitting device 2, and the lithium replenishment device 5 is used for cladding the lithium strip to the surface of the master pole piece 110.

Specifically, the lithium replenishment device 5 includes a lithium strip unwinding mechanism 51, a release agent coating mechanism 52, a press roller mechanism 53, and a traction film winding mechanism 54. The release agent coating mechanism 52 coats different kinds of release agents on both sides of the lithium strip so that after the lithium strip passes through the press roller mechanism 53, the lithium strip is rolled and thinned, and lithium chips are adhered to the press roller mechanism 53. The lithium strip is pulled by a traction film winding mechanism 54, and the traction film winding mechanism 54 can wind the traction film in the lithium strip. In the process of rolling the master pole piece 110 by the press roller mechanism 53, the lithium chips are transferred to the surface of the master pole piece 110, and the lithium replenishment process of the master pole piece 110 is completed.

By providing the lithium replenishment device 5, the lithium replenishment and slitting process of pole pieces 120 are integrated into the pole piece forming apparatus, which can improve the structural integration of the pole piece forming apparatus and simplify the operation procedures in the forming process of the pole piece 120.

Figure 7:
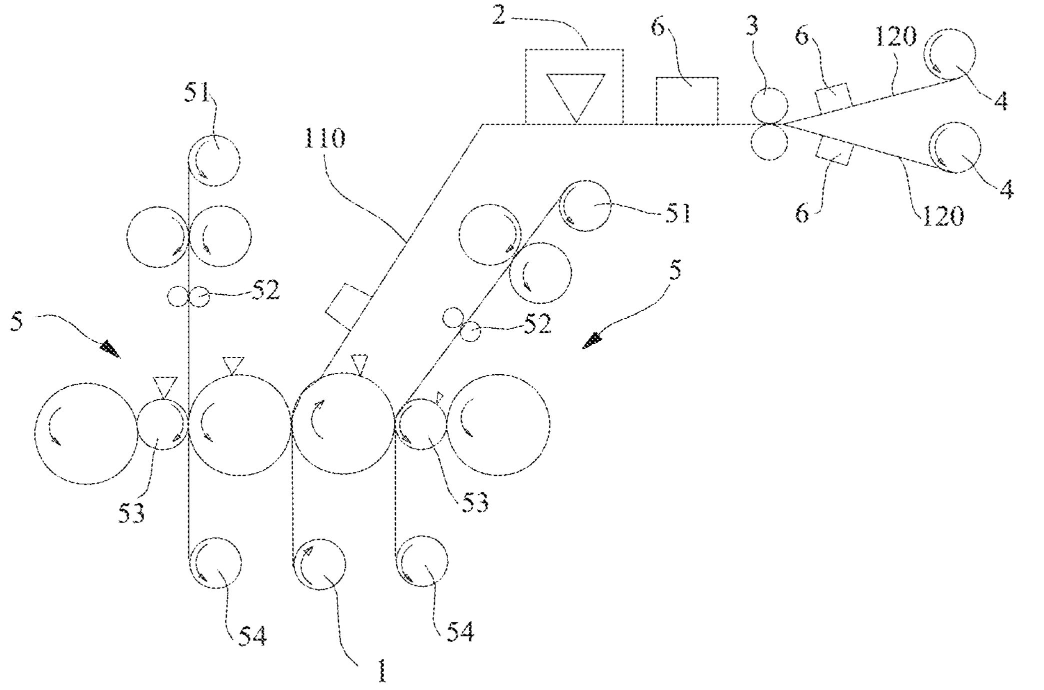
FIG. 7 is a structural schematic diagram of yet another pole piece forming apparatus provided by embodiments of the present application.

In some embodiments, as shown in FIG. 7, the pole piece forming apparatus further includes a deflection correcting device 6. The deflection correcting device 6 is used for guiding a transport direction of the pole pieces 120. By providing the deflection correcting device 6, the possibility of deflection of the pole piece 120 in the transport process can be reduced, so that the yield of the pole piece 120 can be improved.

It can be understood that the deflection correcting device 6 may be provided at an appropriate position as required and there is no limitation here.

In some alternative embodiments, the deviation correcting device 6 is disposed between the slitting device 2 and the wrinkle removing device 3. In this way, after the pole piece 120 is slitted, the pole piece 120 is corrected, so that the wrinkle removing device 3 can more accurately roll to the edge of the slitting edge 120*a* of the pole piece 120 in the subsequent wrinkle removing process, thus having a better wrinkle removing effect.

In other embodiments, the deflection correcting device 6 is arranged between the wrinkle removing device 3 and the winding devices 4. This facilitates the smooth winding of the pole piece 120 and reduces the possibility of secondary wrinkles after the wrinkle removing process of the pole piece 120 is completed.

Figure 8:
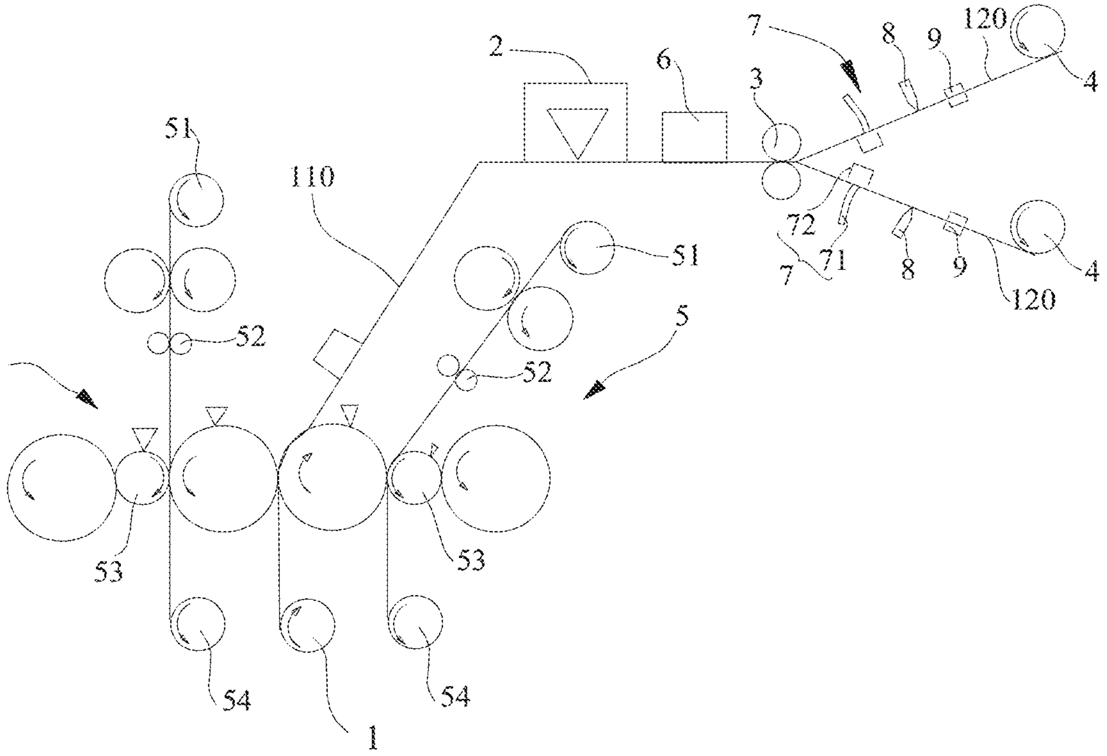
FIG. 8 is a structural schematic diagram of still another pole piece forming apparatus provided by embodiments of the present application.

In some embodiments, as shown in FIG. 8, the pole piece forming apparatus further includes a burr treatment device 7 disposed between the slitting device 2 and the winding devices 4. The burr treatment device 7 is used for removing burrs from the slitting edge 120*a* of the pole piece 120. The risk of damage to the pole piece 120 caused by burrs is reduced.

The specific configuration of the burr treatment device 7 is not limited so long as burrs in the slitting edge 120*a* can be removed. In an alternative embodiment, the burr treatment device 7 includes a brush mechanism 71 and a dust collecting mechanism 72. The brush mechanism 71 is used to remove burrs of the slitting edge 120*a*. The dust collecting mechanism 72 is used to collect burrs removed by the brush mechanism 71. Specifically, the dust collecting mechanism 72 may be a negative pressure dust collecting mechanism or the like.

It can be understood that the burr removed by the brush mechanism 71 cannot be allowed to flow freely, and the dust collecting mechanism 72 should be used to collect it, so as to reduce the risk that burrs flow arbitrarily and affect the cleanliness of the production environment of the pole piece 120, and at the same time, it can reduce the risk that burrs fall on the surface of the pole piece 120 and puncture the pole piece 120 during the subsequent processing of the pole piece 120.

It can be understood that after the pole piece 120 is slitted, the conductive substance in it will be exposed in the external environment. For example, for the pole piece 120 after lithium replenishment, the lithium film at the slitting place of the pole piece 120 will be exposed in the external environment.

In order to avoid the exposure of the slitting edges 120*a* of the pole piece 120 and to reduce the risk of short circuiting of subsequent pole pieces 120, in some alternative embodiments, referring to FIG. 8, the pole piece forming apparatus further includes a glue application mechanism 8 and a drying device 9. The glue application mechanism 8 is provided between the burr treatment device 7 and the winding devices 4 for applying glue to the slitting edge

120*a*. The drying device 9 is arranged between the glue application mechanism 8 and the winding devices 4, for drying the pole piece 120 after glue application. Specifically, after the burr treatment is performed on the slitting edge 120*a* of the pole piece 120, the slitting edge 120*a* of the pole piece 120 is applied with glue, and the width of the glue application can be between 1 mm and 2 mm. After the glue application is completed, the glue layer formed after the glue application is dried by the drying device 9, and finally the pole piece 120 is wound up.

It will be understood that applying glue to the slitting edge 120*a* of the pole piece 120 not only reduces the risk of short circuit of the pole piece 120, but also further removes burrs from the slitting edge 120*a*.

Although the present application has been described with reference to preferred embodiments, various modifications may be made thereto and components therein may be replaced with equivalents without departing from the scope of the present application. In particular, the various technical features mentioned in the various embodiments may be combined in any manner so long as there is no structural conflict. The present application is not limited to the specific embodiments disclosed herein but includes all technical solutions falling within the scope of the claims.

What is claimed is:

1. A pole piece forming apparatus, comprising:
- an incoming structure to provide a master pole piece;
- a slitter to slit the master pole piece into a plurality of pole pieces;
- a plurality of winders to transport pulling of the pole pieces, respective winders winding the corresponding pole pieces, and the slitter being disposed between the incoming structure and the winders; and
- a wrinkle remover between the slitter and the winders, wherein the wrinkle remover comprises a first roller and a second roller that are provided opposite to each other, the first roller comprises a first rolling part, and the first rolling part and the second roller roll an edge of a slitting edge of one of the pole pieces,
- wherein a diameter of the first rolling part is changed from small to large in an axial direction of the first roller, and a portion with a largest diameter of the first rolling part rolls the edge of the slitting edge; and a portion with a smaller diameter of the first rolling part is closer to a middle position of the one of the pole pieces.

2. The pole piece forming apparatus according to claim 1, wherein the diameter of the first rolling part is changed from small to large by an arc transition structure or a step structure.

3. The pole piece forming apparatus according to claim 1, wherein in the axial direction of the first roller, the diameter of the first rolling part first is changed from small to large and then is changed from large to small.

4. The pole piece forming apparatus according to claim 1, wherein the second roller comprises a second rolling part opposite the first rolling part, and a diameter of the second rolling part is changed from small to large in an axial direction of the second roller; and a portion with a largest diameter of the second roller is opposite to the portion with the largest diameter of the first roller.

5. The pole piece forming apparatus according to claim 1, wherein the first roller is internally provided with a flow path to circulate a heat conductive medium, and the heat conductive medium exchanges heat with the first roller.

6. The pole piece forming apparatus according to claim 5, wherein the heat conductive medium exchanges the heat with the first roller to maintain a surface temperature of the first roller adjacent to the one of the pole pieces between 35° C. and 40° C.

7. The pole piece forming apparatus according to claim 5, wherein the flow path is helically arranged about a centerline of the first roller.

8. The pole piece forming apparatus according to claim 7, wherein a distance between the flow path and an outer surface of the first roller is d, where $0<d\leq 2$ mm.

9. The pole piece forming apparatus according to claim 1, further comprising:
- a lithium replenisher arranged between the incoming structure and the slitter, wherein the lithium replenisher clads a lithium strip to a surface of the master pole piece.

10. The pole piece forming apparatus according to claim 1, further comprising:
- a deflection corrector to guide a transport direction of the pole pieces; wherein
  - the deflection corrector is arranged between the slitter and the wrinkle remover; and/or, the deflection corrector is arranged between the wrinkle remover and the winders.

11. The pole piece forming apparatus according to claim 1, wherein
- the pole piece forming apparatus further comprises a burr treatment structure disposed between the slitter and the winders, the burr treatment structure comprising:
- a brush to remove burrs of the slitting edges; and
- a dust collector to collect the burrs removed by the brush.

12. The pole piece forming apparatus according to claim 11, further comprising:
- a glue applicator disposed between the burr treatment structure and the winders to apply glue to the slitting edges; and
- a dryer arranged between the glue applicator and the winders to dry the pole piece after glue application.

* * * * *